United States Patent [19]
Roehner

[11] 3,928,701
[45] Dec. 23, 1975

[54] HELIX OF A SERIES OF DISCARDED VEHICLE TIRES

[76] Inventor: Soll Roehner, P. O. Box 428, Pompano Beach, Fla. 33061

[22] Filed: July 16, 1974

[21] Appl. No.: 488,959

[52] U.S. Cl. ............... 428/222; 428/131; 428/223; 114/219; 293/1; 293/71
[51] Int. Cl.² .................. B63B 59/02; B60R 19/00; B61F 19/04
[58] Field of Search .............................. 161/47–48; 293/1, 71 P, 71 R; 114/219; 428/57, 61, 222, 131, 223; 85/7; 61/5

[56] References Cited
UNITED STATES PATENTS

| | | | |
|---|---|---|---|
| 2,843,074 | 7/1958 | Norman | 293/71 R X |
| 2,874,669 | 2/1959 | Norman | 293/71 R X |
| 3,125,979 | 3/1964 | Darling | 114/219 |
| 3,165,305 | 1/1965 | Pfleger | 114/219 X |
| 3,338,206 | 8/1967 | Motter | 114/219 |
| 3,664,653 | 5/1972 | Walker | 293/1 X |
| 3,764,446 | 10/1973 | Martin | 293/1 X |

*Primary Examiner*—Philip Dier
*Attorney, Agent, or Firm*—Harry N. Schofer

[57] ABSTRACT

An article of manufacture consisting of a structure in form of a helix and/or a spiral made from a series of discarded vehicle tires. The tire annulus is transversely severed, and the end of one tire is secured to the end of another tire, in series, in the form of a helix and/or a spiral. Such a structure can be used for a number of various purposes, for example, artificial sea reefs, sea shore barriers to discourage the loss of beach front by scouring and wave action of the sea, and to encourage accretion, as boat fenders and as automobile bumpers or buffers, as highway impact absorbers or attenuators, as column buffers, as truck dock buffers, as play yard amusement devices, etc.

22 Claims, 16 Drawing Figures

HELIX OF A SERIES OF DISCARDED VEHICLE TIRES

BACKGROUND OF THE INVENTION

Field of the Invention

This invention relates to an article of manufacture made from discarded vehicle tires, and finds use for a number of purposes, a few of which are set forth below.

The term "discarded", as used herein, has reference to vehicle tires no longer suitable for their intended purpose. The principal source of discarded tires would be those tires that are "worn out", that is, tires in which the rubber tread is worn beyond a safe condition for further use, and which may or may not be recappable. Another source would be those tires that may have considerable tread, but which are not repairable due to blow-outs or dangerous cuts or weak conditions of the underlying fabric. Another source is new tires which, due to some imperfection in the manufacturing process, may have been condemned as being unfit for their intended purpose.

A number of uses for discarded tires has been suggested, such as in the manufacture of foot wear, and as artificial reefs wherein the tires are perforated and used singly, or tied together in a bundle and tossed into the sea. Formerly, great quantities of discarded tires were burned in fruit orchards to avert frost damage, but such practice is now illegal on the ground that it causes pollution of the atmosphere.

When one considers that there are more than 125,000,000 tire using vehicles in this country alone, travelling billions of miles annually, it is apparent that there are more than a quarter of a billion discarded tires accumulating annually, creating a glut on the market, and requiring large storage spaces, usually outdoors, in unsightly heaps.

SUMMARY OF THE INVENTION

It is an object of this invention to create an article of manufacture which uses vehicle tires, particularly discarded tires, for a number of useful purposes.

It is a further object to create an article of manufacture utilizing discarded vehicle tires in the form of a helix and/or a spiral, for a number of useful purposes.

The attainment of the above objects, as well as other objects and advantages which will become apparent from a reading of the following specification, is accomplished by an article of manufacture comprising a series of connected loops made from vehicle tires, preferably discarded vehicle tires. The annulus of each endless, generally tubular tire is severed transversely thereof to form a loop having a pair of ends, and the end of one tire is connected with the end of another tire using any well known means such as cementing, stitching, stapling, riveting, patching, etc. The series so formed is disposed in the form of a helix and/or a spiral, and the structure so created can be utilized for a number of diverse purposes, for example, as an artificial reef; a sea shore barrier to discourage the loss of beach front by scouring action and to encourage accretion by the wave action and ocean currents; boat fenders and automobile buffers; highway impact absorbers; column buffers; truck dock buffers; playground amusement devices, etc.

BRIEF DESCRIPTION OF THE DRAWINGS

For a clearer understanding of the invention and its uses, reference is made to the detailed description which follows and to the annexed drawings, in which.

DESCRIPTION OF PREFERRED EMBODIMENTS

Figure 1:
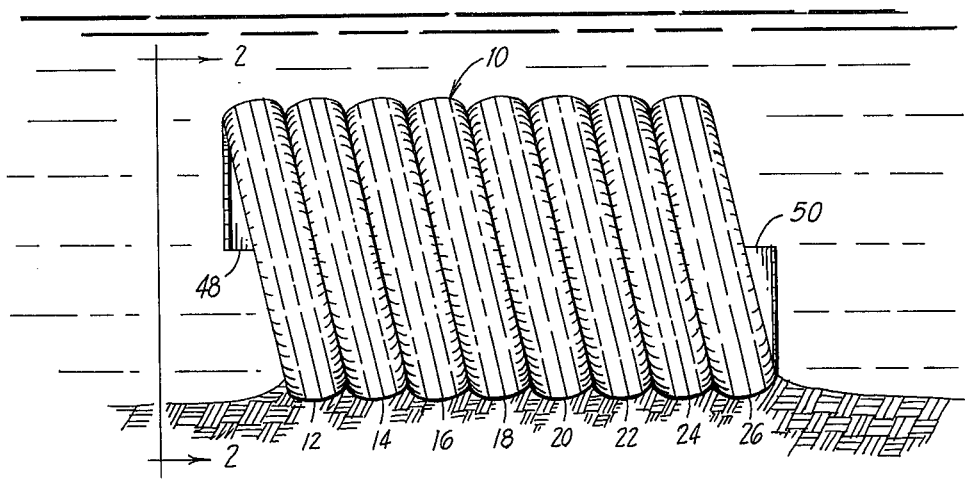
FIG. 1 is an elevation view of a first embodiment of the invention, showing a helical form of the invention that is useful for a number of purposes, and particularly suitable for use as an artifical sea reef.
Figure 2:
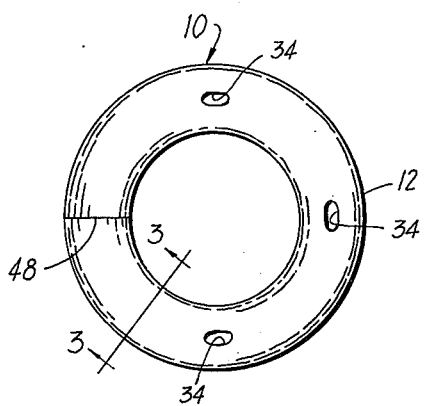
FIG. 2 is an end view, taken on the line 2—2 of FIG. 1.
Figure 3:
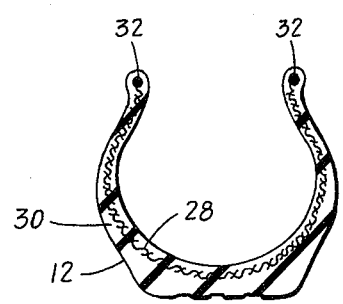
FIG. 3 is a sectional view through one of the turns forming the helix of FIG. 1, taken on the line 3—3 of FIG. 2.

Referring to the annexed drawings, illustrating a number of preferred embodiments of the invention, and particularly to FIGS. 1, 2 and 3, illustrating a first preferred embodiment, the numeral 10 designates an article of manufacture made from a series of discarded vehicle tire loops 12, 14, 16, 18, 20, 22, 24 and 26, each tire forming a turn of a helix, the tires being serially connected in end-to-end relation, the turns being in contiguous or abutting relation.

DEFINITION OF TEMS USED HEREIN

As used herein, the term "loop", tire loop, or vehicle tire loop refers to a vehicle tire which has been severed transversely of its annulus to provide a pair of ends.

The term "turn" has reference to a circle in a helix or a spiral.

The term "helix" refers to a geometrical figure formed by a series of coaxial turns of substantially the same diameter in side-by-side relation, such as may be generated by a winding of a thread about an elongated spool.

The term "spiral" refers to a geometrical figure formed by a series of turns of increasing diameters and lying in substantially the same plane as, for example, the main spring or the hair spring of a watch or clock, or the form generated by a tape or film wound on a reel about a common center.

The term "generally tubular" is used to define a construction similar to the conventional vehicle tire, having a transverse cross section generally in the form of an arc of a circle.

Referring to FIG. 3, the typical vehicle endless, generally tubular tire is generally U-shaped in cross section, and comprises a number of plies of fabric 28, such as cotton, rayon, nylon, etc., embedded in rubber. A layer of rubber 30, forming the side walls and the tread or outer wear surface, covers the plies of fabric. A pair of steel hoops 32 passes through the end of the U as reinforcing members.

Each tire is severed transversely of the annulus, forming a loop having a pair of ends 48 and 50. Any well known means can be used to sever the tire, including cutters, saws and torches. The cut may be straight or irregular, and may be in an axial plane, as shown, or at any desired angle relative thereto. While the drawings illustrate the use of tires having the same dimensions, it is evident that tires having different diameters and cross sections may be interconnected to form a helix, or a spiral.

The end 48 of one tire loop may be connected with an end 50 of another tire loop by any desired well known connecting means, for example, cementing in end-to-end contact or in end abutting relation, rivetting, stapling, connecting links, stitching, etc.

An article of manufacture, so formed, can be used for a number of different purposes, one example being as an artificial sea reef. Any number of tire loops can be connected to form a helix. A plurality of perforations 34 are formed in the side walls of each tire loop. Any desired number of such helixes are lowered to the bottom of the sea, the perforations 34 permitting the escape of trapped air from the interior of the tires, thus assuring that the helixes will remain submerged. If desired, suitable anchoring means may be provided to maintain the artificial reefs in place.

The connection of additional tire loops to the helix in series may vary in quantity with the overall length requirements of the completed helix. The length of the helix may be unlimited, governed by practical requirements.

To cope with the migratory tendencies of a simple helix when used as an artificial reef, a few suggested patterns of various multiple helixes placed horizontally are as follows: (1) The two ends of a simple helix may be interconnected to form a helical annulus; (2) Two helixes may be connected in the form of an "X"; (3) Three helixes may be connected in the form of the letter "H"; (4) A quantity of helixes may be connected to form a grid pattern. Other varieties of patterns may be used to suit particular situations.

In turbulent waters, hollow concrete blocks may be used as weights on the helix to overcome buoyancy, drift and migration. The ends of the helix may be caused to penetrate through appropriate quantities of hollow concrete blocks and "screwed" to the optimum position of the helix. The lower portions of the helix will eventually collect sediment serving to fix the position of the artificial reef.

Each tire loop sidewall is multiple perforated to permit the relief of trapped air, thereby overcoming potential buoyancy. Ropes or cables may be reeved through the perforations to adjust and maintain the spacing between the turns.

This form of the invention is also useful as a water barrier and earth retaining device, serving to attenuate wave and surf energy, and promote the accumulation of earth sediment and retard erosion when placed along the sea shore. It is also useful as a retaining wall for sea shore fill.

As boat fenders, desired lengths of the helix are hung on the sides of boats to protect the boats from damage when bumping another body. The fenders may be fastened to the side of the boats horizontally or vertically, and are intended to attenuate the forces of pressure and impact. Ropes can be passed through the apertures in the side walls and fastened to the boat. The helical form and the perforations will drain any water that may be collected. Impact and pressure energy applied against any loop of the helix will be automatically distributed throughout the remainder of the helix, thereby dissipating the forces. The resilient characteristics of the helix will automatically restore the helix to its normal form when the forces are relieved. The helix may be painted with conventional or luminous materials, and may also be provided with reflectors for night visibility.

For use as an automobile bumper, the helix may be fastened to the front bumpers and/or to the rear ends of vehicles, to absorb, cushion or attenuate forces of pressure and impact. For such protection, it is particularly valuable on automobile wrecker vehicles.

When used as a protection means for a truck or a boat dock, one or more rods are passed through the perforations in the side walls, and the helix is fastened horizontally to the edge of the truck or boat dock in a position to be engaged by a truck or boat, to cushion the impact of such truck or boat in an obvious manner.

As a column bumper, a desired length of the helix may be screwed to wrap around structural columns or posts, to serve as a bumper.

In the manufacture of the helix, the use of worn vehicle tires presents the problem of exposed surfaces of worn or damaged treads. To improve the appearance, the worn tires may be everted to expose the inner surfaces, thereby presenting relatively unworn exposed surfaces. Everting of the tires may be accomplished by performing a cut across each tire, transversely of the annulus, and then folding each of the side walls in a direction generally opposite to the normal side wall position, resulting in a profile that is practically similar to the normal "U" shape.

In order to resist the tendency of the side walls to return to their original position, ropes or rods are reeved through the previously prepared perforations in the side walls to maintain the side walls in their everted position. This function for the ropes or rods supplements other functions described herein for ventilation, alignment, and/or fastening the helix to a vehicle or base structure.

As an alternative, the side walls of adjacent loops in the helix may be fastened together to maintain the altered side wall positions, with the aid of mechanical devices, adhesives, etc.

The helix may be reduced in dimension from its normal diameter by winding it around a mandrel of lesser dimensions. Perforations are made in the tire in series and in alignment to receive ropes or rods lengthwise, to properly align the helix so formed and to maintain the altered diameter dimensions. The ropes and rods will also serve as a means of fastening the helix in position for use as a buffer to the surface of a vehicle, platform, stanchion, column, or other structure or device.

The reduced diameter helix may be readily applied as an automobile bumper aid when the larger diameter helix may interfere with the flow of air to the vehicle cooling system.

The reduced diameter helix may be fitted into the cavity of a larger diameter helix to beef up the helical body of the completed article.

Reduction in the diameter of the helix may be performed to conform to particular dimension requirements. Also, the reduction in the diameter of the helix will automatically provide more stiffness to the helix body for improved resistance to impact with another body.

A mandrel type device may be employed to alter the "U" shaped profile of the tires, such as reversing the positions of the side walls and/or corrugating the tire fabric.

The mandrel device may have a matching pilot follower designed to reverse the sidewalls. The mandrel may also be constructed with a pitched threaded surface generally resembling the contour of a worm gear in forming the helix. The matching pilot follower gear should be broached to match the mandrel contours. The tire fabric which passes through the threaded mandrel and the broached pilot will be shaped to a corrugated profile sheet in a helical form.

Also, the mandrel and pilot follower may be designed so that the tire fabric ribbon will be flat or corrugated for use in forming a helix or for other products requiring a fabric, particularly when cut across the tire transversely of its annulus and fastened in end-to-end relation, with other tires similarly prepared in ribbon form.

As a serpentine toy, the product is formed in a helix which may be used as a "tunnel" for children to crawl through or to crawl over in play. Truck size tires may be preferred because of their large dimensions.

The helical tunnel may be placed horizontally in the play area. The bottom portion of the wall of the helix may be provided with a floor made from a flat tire fabric mat. As an alternative, plywood finished with soft material, like burlap or carpet, could be employed.

The helix could obviously be curved to various geometric patterns. It may also be decorated with paint or other covering materials.

Figure 4:
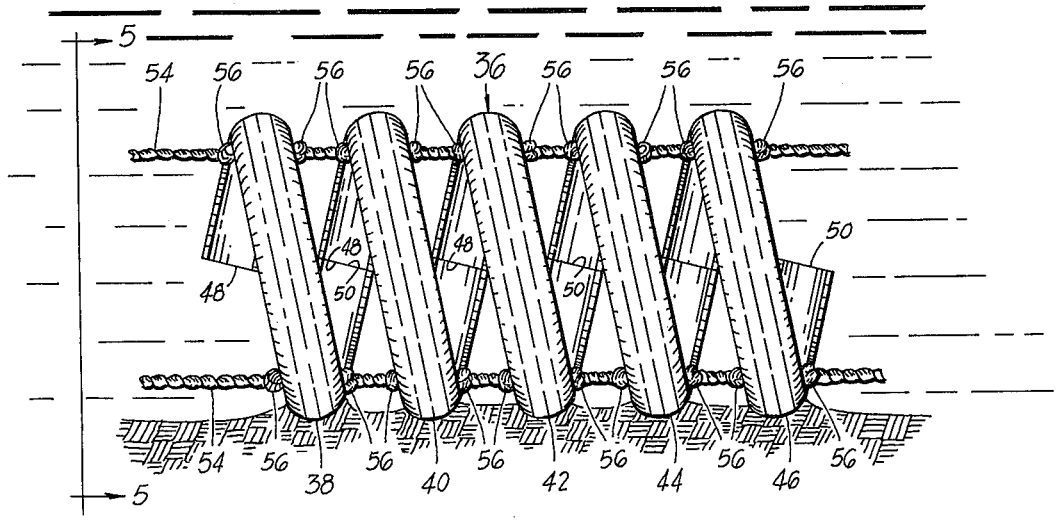
FIG. 4 is an elevation view of a second embodiment of the invention, in the form of a helix in which the turns are disposed in spaced relation, particularly suitable for use as an artificial sea reef and as a sea shore barrier.
Figure 5:
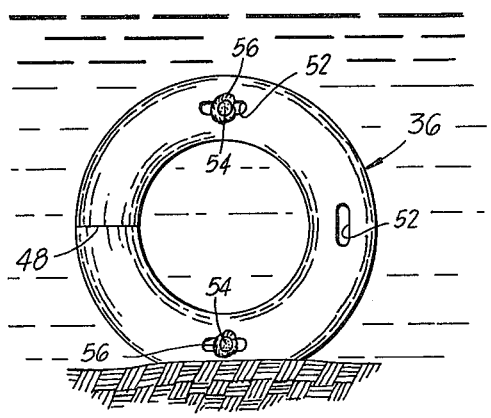
FIG. 5 is an end view of FIG. 4, taken on the line 5—5 thereof.

A second preferred embodiment is illustrated in FIGS. 4 and 5, in which an article of manufacture 36 is formed from a series of discarded tire loops disposed in turns 38, 40, 42, 44 and 46. As described above in connection with the first embodiment, each tire is severed transversely of the annulus to form tire loops, and the end of one tire loop is attached to the end of another tire loop to form a helix. The side walls of each tire loop are perforated at 52.

This embodiment differs from that shown in FIGS. 1, 2 and 3 in that the loops 38, 40, 42, 44 and 46 are disposed in spaced relation. For this purpose, tying means in the form of a pair of ropes or cables 54 are reeved through the perforations 52, and a plurality of knots 56 or other similar means are provided adjacent the walls of the tire loops in the turns to form spacers. When the opposite ends of each tying means are pulled taut, the turns are spread in spaced relation as shown. The ends of the tying means may be anchored to retain the helix in desired position. As in the case of the previously described embodiment, the embodiment illustrated in FIGS. 4 and 5 is useful for a number of different purposes, but particularly for building an artificial sea reef, in which the perforations 52 allow the escape of air, thus preventing the formation of air pockets and their resultant buoyant effect. Elongated strips cut from the tire body may be used for the tying means, to take advantage of their durability in sea water.

Figure 7:
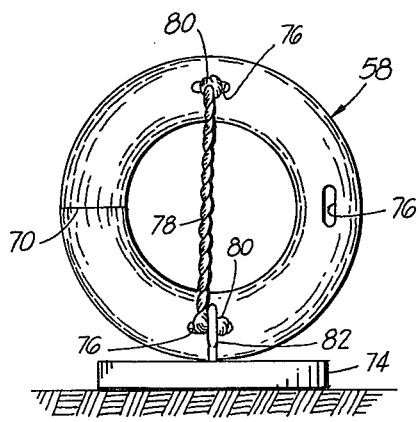
FIG. 7 is an end view of FIG. 6, taken on the line 7—7 thereof.
Figure 6:
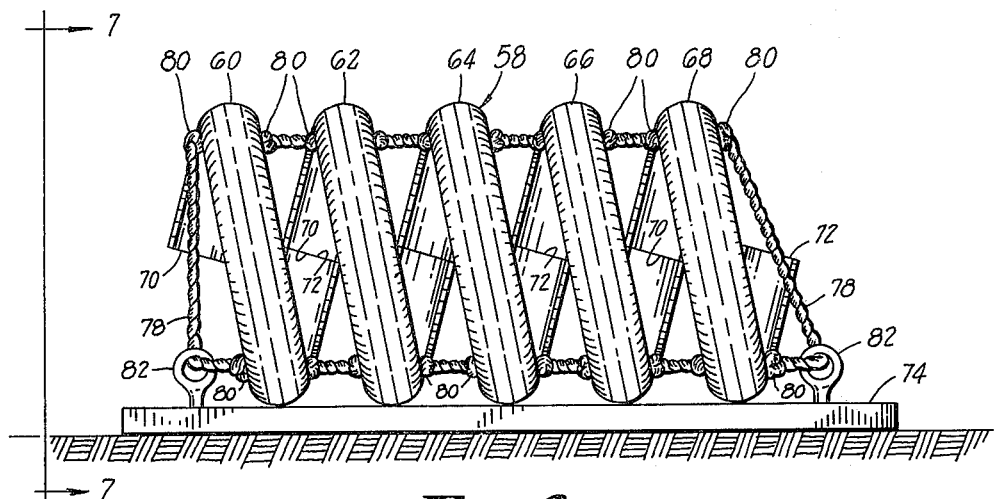
FIG. 6 is an elevation view of a third embodiment of the invention, in the form of a helix in which the turns are disposed in spaced relation, and mounted on a base, particularly suitable for use as a highway impact attenuator, and as a sea shore barrier.

A third embodiment of the invention is illustrated in FIGS. 6 and 7, in the form of a helix mounted on a supporting means, and finds particular use as an artificial sea reef, a sea shore barrier, or as a highway impact attenuating device to be placed along highways at dangerous points to absorb and/or attenuate the impact of a vehicle.

The article of manufacture is designated by the numeral 58 and comprises a series of discarded tire loops disposed in spaced loops 60, 62, 64, 66 and 68, the end 70 of one turns being secured to an end 72 of another loop by any suitable connecting means to form a continuous helix. As in the previously described forms of the invention, each tire is made from a discarded tire which has been severed transversely of the annulus, thereby forming two ends 70 and 72. The side walls of the tire loops are perforated, as shown at 76.

In this embodiment of the invention, the helix is mounted on a supporting means in the form of a slab 74 of any selected material, preferably steel for the purpose indicated. A tying means, in the form of a cable or rope 78, is reeved through aligned apertures 76 in the tire loops, and spacing means, shown in the form of knots 80 in the rope, for example, are disposed adjacent opposite sides of each loop will, when the tying means are drawn taut, maintain the turns in spaced relation as shown. The tying means 78 is reeved through a pair of eye bolts 82 secured to opposite ends of the slab 74, whereby the helix is fastened to the slab and the turns are held in spaced relation as shown.

For use as a sea shore barrier, to attenuate wave and surf energy, and to promote the accumulation of sand and earth sediment and to retard erosion of the sea shore, a number of these articles of manufacture may de disposed along the sea shore where they are subjected to wave and surf action.

For use as a highway impact attenuator or absorber, one or more of these articles of manufacture may be strategically located at potentially hazardous positions beside a highway, to attenuate forces of impact of a vehicle that may inadvertently leave the highway. The attenuator may vary in dimensions and patterns according to particular requirements. The ropes or cables serve to align and to brake the motion of the moving vehicle, thereby participating in the attenuation of the energy resulting from collision by the moving vehicles.

When engaged by impact of a vehicle in motion, the attenuator will automatically and gradually modify the velocity of the vehicle and is intended to finally halt, without causing damage to, the vehicle.

The weight of the vehicle on the slab will cause the slab to be further restrained from unlimited movement by friction between the bottom of the slab and the surface on which it rests, thereby contributing to the dissipation of the forces of impact.

The forces of the impact will be transmitted by the moving vehicle to the attenuator. The reaction to the engagement with the moving vehicle is automatic — each of the turns will bend, sway and deform over the entire helix. If the impact forces are heavy enough, the slab is projected by the vehicle impact and motion. The slab weight provides inertia to further absorb energy. The bottom of the slab, in motion, abrades the surface on which it rests, thereby contributing to the dissipation of the forces of the impact and motion.

Attenuators of various lengths may be employed as temporary highway or street dividers, turnoff lane guides, construction barriers, etc. Automobile race track peripheries may be delineated with such articles of manufacture for safely cushioning the impact and to halt the motion of vehicles out of control.

The slab may also be constructed of grating, iron plates checkered on both sides, cable nets, or other materials which will provide inertia, abrasiveness and durability.

The attenuator may be painted with conventional or fluorescent material, and also may be provided with reflectors for night time visibility.

Figure 8:
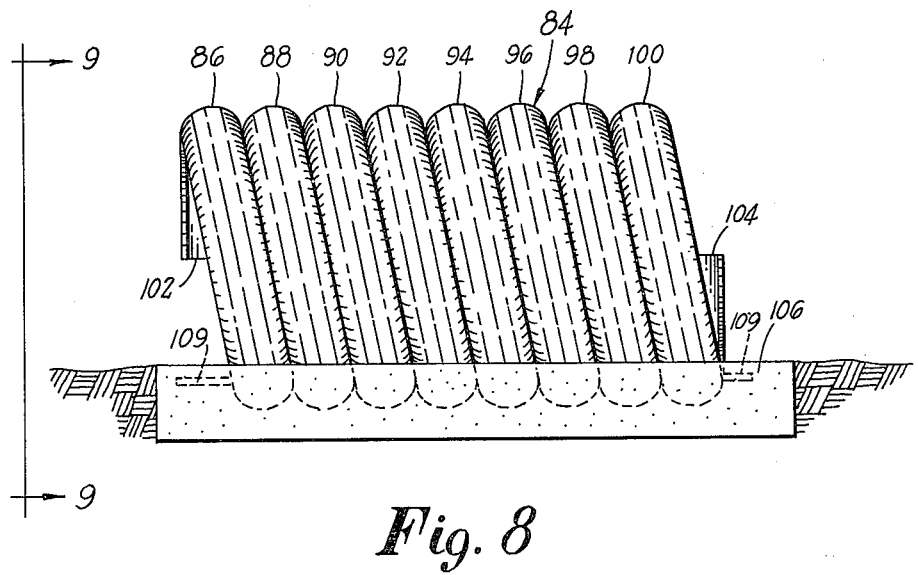
FIG. 8 is an elevation view of a fourth embodiment of the invention, in the form of a helix in which the turns are contiguous and mounted on a base, particularly suitable for use as a highway impact attenuator and as a sea shore barrier.
Figure 9:
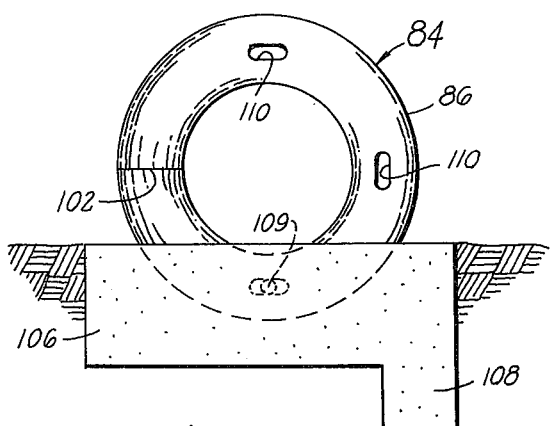
FIG. 9 is an end view of the embodiment illustrated in FIG. 8, taken on the line 9—9 thereof.

FIGS. 8 and 9 illustrate a fourth embodiment of the invention particularly adapted, although not necessarily limited, for use as a sea shore barrier. In this form of the invention the article of manufacture is designated in its entirety by the numeral 84 and comprises a series of tire loops consisting of adjacent turn 86, 88, 90, 92, 94, 96, 98 and 100, which have been made from vehicle tires severed transversely of their annuli forming loops having ends 102 and 104 on each tire loop, the end of one tire loop being connected with the end of an adjacent and adjoining tire loop by any suitable connecting means. The lower part of each turn is embedded in a concrete slab 106 having a downwardly extending flange 108, resulting in an L-shaped cross section as seen in FIG. 9, the slab forming a supporting means. The helix is embedded in the slab when the concrete is poured, the concrete being permitted to set and harden to firmly secure the helix within the slab. As in the other forms of the invention, a plurality of perforations 110 are formed in the side walls of each tire loop for drainage and/or for reeving a tying means therethrough. A reinforcing rod 109 passes through other aligned perforations.

When used as a sea shore barrier, or for a highway impact barrier, the device is placed in position alongside the sea slide, or highway, and parallel therewith. As seen in FIG. 9, when waves or surf, carrying silt, break against the barrier, the force of the water is broken by contact with the helix, and the silt is deposited and allowed to build up on the side away from the sea, as well as within the tires. The flange 108 is buried in the sand to retain the barrier in position.

Although, as shown in FIG. 8, the adjoining turns are in abutting relation, it is evident that the turns can be disposed in spaced relation as in the modification shown in FIG. 6.

Figure 11:
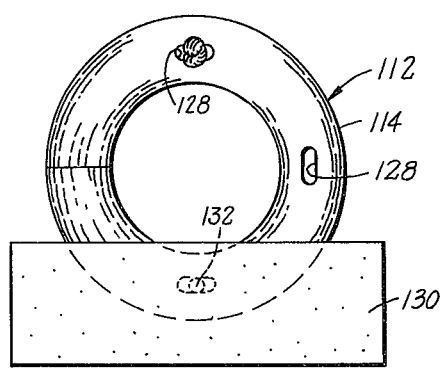
FIG. 11 is an end view of the embodiment illustrated in FIG. 10, taken on the line 11—11 thereof.
Figure 10:
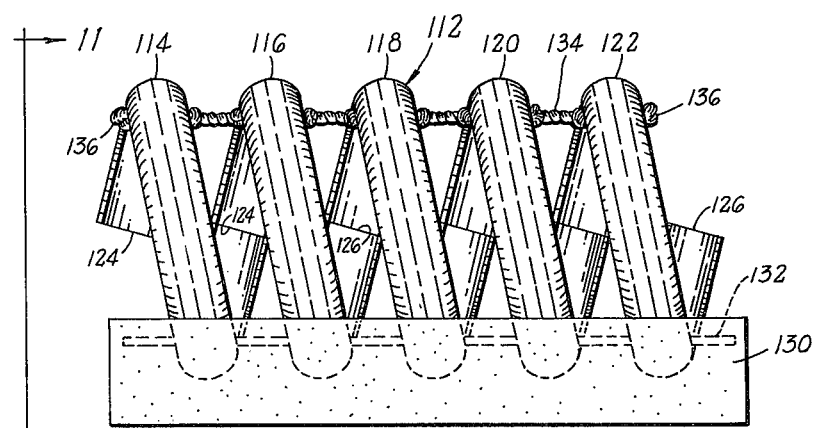
FIG. 10 is an elevation view of a fifth embodiment of the invention, similar to that shown in FIG. 8 but including spacing means.

FIGS. 10 and 11 illustrate a fifth preferred embodiment of the invention, particularly adapted for use as a highway impact barrier, although not limited as to use therefor. In this form of the invention the article of manufacture is designated in its entirety by the reference numeral 112, and comprises a helix in the form of a series of spaced loops turns 114, 116, 118, 120 and 122, each loop turn being made from a discarded vehicle tire which has been transversely severed forming a loop having the ends 124 and 126, an end 124 of one tire loop being secured to an end 126 of an adjoining tire loop by any well known means to form a continuous helix. Each turn includes a plurality of perforations 128 aligned with similar perforations in an adjacent turn. The lower end of each turn is embedded in a base in the form of an elongated concrete slab 130, and a reinforcing rod 132 is passed through aligned perforations 128 to retain the turns in position during the pouring operation of the concrete and the subsequent setting thereof, the reinforcing rod also serving as a strengthening member for the base. A spacing means, in the form of a rope or cable 134, is reeved through aligned perforations 128 in the upper part of the turns, there being a knot 136 formed adjacent each side wall of each turn, to pass the shock resulting from the impact of a vehicle through all of the turns in an obvious manner.

Figure 12:
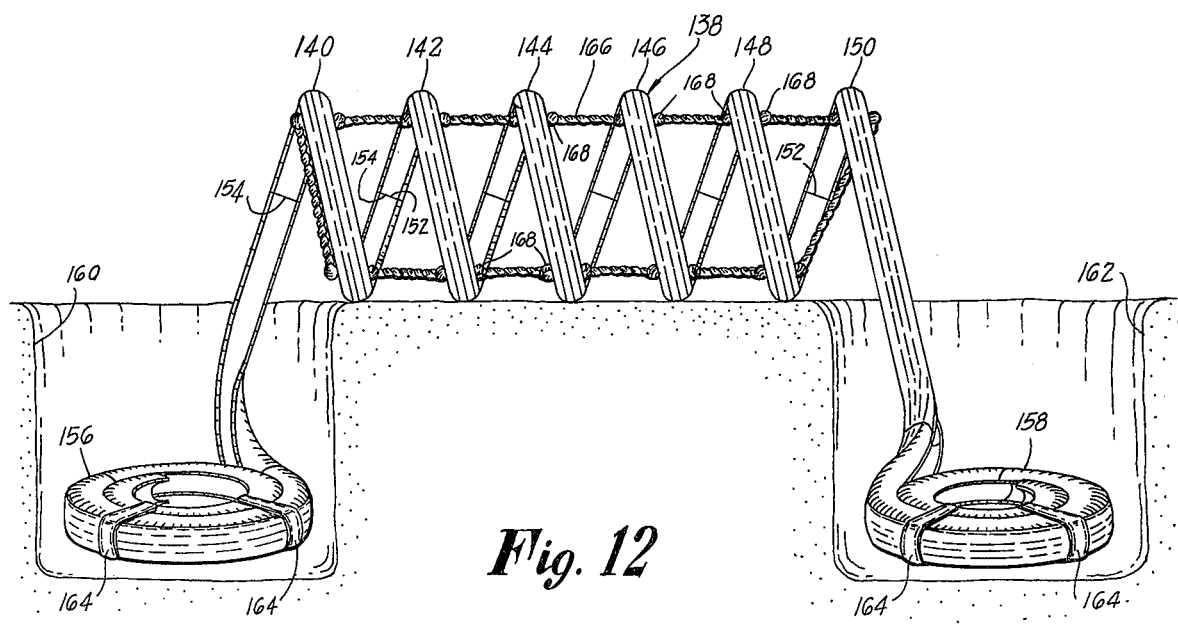
FIG. 12 is an elevation view of a sixth embodiment of the invention, in the form of a helix having a spiral coil on each end, serving as deadmen.

A sixth preferred embodiment of the invention is illustrated in FIG. 12, intended for use as a highway impact barrier to be placed alongside of a highway at strategic point or points where a vehicle is likely to leave the road. In this form of the invention, the article of manufacture is designated in its entirety by the reference numeral 138 and comprises a middle portion in the form of a helix made up of a series of connected turns 140, 142, 144, 146, 148 and 150, each turn being made from a loop formed from a discarded vehicle tire which has been severed transversely of the annulus, forming a pair of ends 152 and 154 on each tire loop, the end 152 of one tire loop being connected, by any well known means, to the end 154 of an adjacent tire loop, forming a continuous helix. The two ends of the helix are connected by discarded tire loops, which have been elongated, to a pair of spirals 156 and 158, serving as deadmen, each spiral being buried in a pit 160 and 162, respectively, alongside the highway, and covered with earth to retain the helix in position. A plurality of tying means 164 are bound around each spiral to retain them in coiled position.

As in the case of the previously described embodiments, a plurality of aligned apertures (not shown) are provided in the side walls of each turn, and spacing means, in the form of an endless rope or cable 166, is reeved through the apertures. Knots, or other similar means, are formed adjacent each side wall, to retain the turns in spaced relation when the ends of the helix are made taut by the deadmen on each end.

Figure 13:
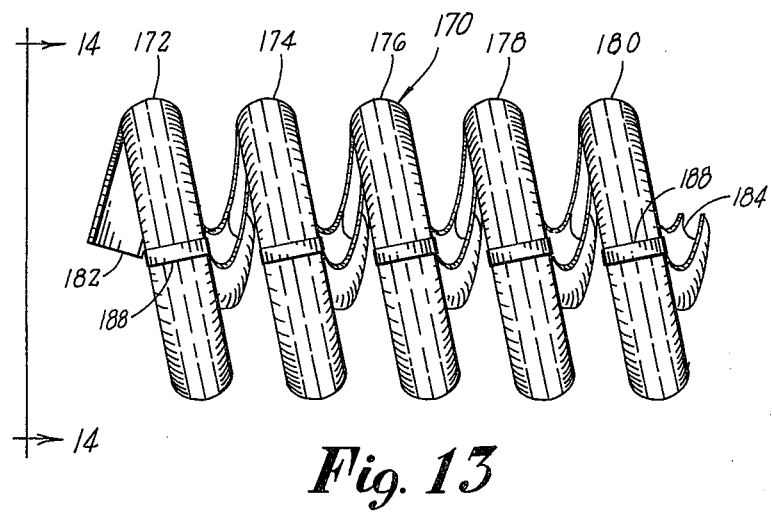
FIG. 13 is an elevation view of a seventh embodiment of the invention in the form of a helix, each turn of the helix being in the form of a spiral.
Figure 14:
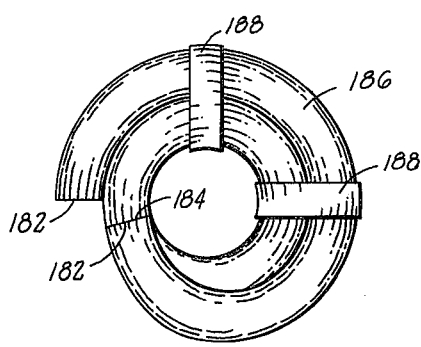
FIG. 14 is an end view of the embodiment of FIG. 13, taken on the line 14—14 thereof.

A seventh preferred form of the invention is illustrated in FIGS. 13 and 14 in which the article of manufacture is in the form of a helix, each turn thereof being made of tire loops arranged in the form of a spiral. This form of winding of the helix can be substituted for any of the helixes in the above described embodiments.

In this embodiment of the invention, the article of manufacture is designated in its entirety by the reference numeral 170, and comprises a helix made up of a series of turns 172, 174, 176, 178 and 180 made from tire loops. Each loop is made by one or more discarded vehicle tires, each tire being severed transversely of the annulus thereof forming a pair of ends 182 and 184, the end 182 of one tire loop being secured to the end 184 of another tire loop by any well known means, thereby forming a series of connected tire loops. As shown, each turn is in the form of a spiral 186 containing at least one discarded tire loop, there being a plurality of tying means 188 passing about the turns in the spiral to retain the turns in position. It is evident that, if the diameter of the turns of the spiral were sufficiently reduced, as by means of a mandrel, a single vehicle tire loop could form an entire spiral.

Articles of this form are particularly suitable for use as bumpers, buffers, impact absorbers, etc.

Figure 15:
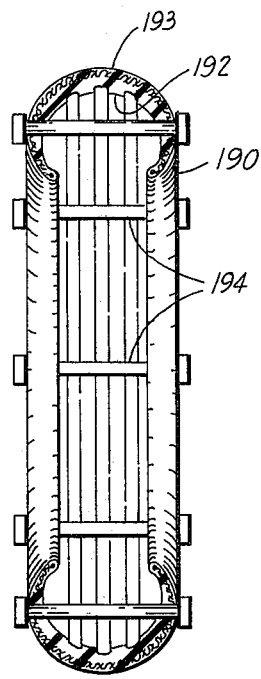
FIG. 15 is a sectional view through an everted tire.

FIG. 15 illustrates an arrangement of the invention in which the tire is everted after being severed transversely of the annulus. Tire loops, so everted, can be disposed in helical form or in spiral form as described above, by connecting a series of such tire loops in end-to-end relation.

The tire loop is designated by the numeral 190, and is everted to dispose the tread 192 on the inner surface and the smooth surface 193 on the outside. A plurality of retaining means, in the form of bolts 194, for example, pass through aligned apertures in the side walls. It is evident that, in the form of a helix, a single elongated bolt or rod may pass through the aligned apertures of the series.

Figure 16:
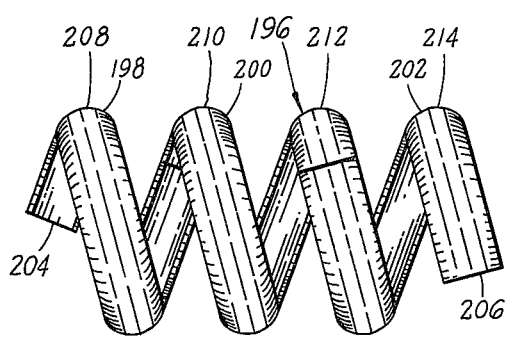
FIG. 16 is an elevation view of a helix in which the diameter of the severed tires or tire loops has been reduced.

FIG. 16 illustrates a modified form of helix 196 consisting of a series of discarded tire loops 198, 200 and 202. Each of these tire loops is made from a vehicle tire that has been severed transversely of the annulus to form a tire loop having a pair of ends 204 and 206, the end 204 of one tire loop being connected, by any well known means, to an end 206 of an adjoining tire loop, forming a continuous helix, the turns of which are designated as 208, 210, 212 and 214. The diameter of each tire loop is reduced, whereby each individual tire loop forms more than one turn of the helix. The turns of the helix are illustrated in spaced relation in order to better illustrate the interconnected ends. This form of the invention can be screwed about a pole to serve as a bumper, or about the bumper of a vehicle to absorb forces of impact.

I claim:

1. An article of manufacture, comprising: a structure including a series of connected vehicle tire loops, said loops being generally tubular in form, and means connecting the end of one loop with the end of another loop in end-to-end relation.

2. An article of manufacture as defined in claim 1, in which said tire loops comprise discarded tires.

3. An article of manufacture as defined in claim 1, in which at least some of the tire loops are disposed in the form of adjacent turns.

4. An article of manufacture as defined in claim 3, in which the walls of the tire loops are in everted position.

5. An article of manufacture as defined in claim 4, including tying means retaining the tire loop walls in everted position.

6. An article of manufacture as defined in claim 3, in which the diameters of at least some of the turns are less than the original diameters of the tire loops.

7. An article of manufacture as defined in claim 3, in which at least some of the loops are in turns in the form of a spiral.

8. An article of manufacture as defined in claim 3, in which at least some of said loops are in turns in the form of a helix.

9. An article of manufacture as defined in claim 8, in which said tire loops include perforations through the walls thereof.

10. An article of manufacture as defined in claim 8, including tying means interconnecting successive turns of said helix.

11. An article of manufacture as defined in claim 9, including tying means passing through at least some of said perforations.

12. An article of manufacture as defined in claim 11, in which said tying means includes spacers retaining successive turns in spaced relation.

13. An article of manufacture as defined in claim 8, including a supporting means, and means attaching said helix to said supporting means.

14. An article of manufacture as defined in claim 13, in which said supporting means comprises an elongated slab.

15. An article of manufacture as defined in claim 14, including tying means securing said helix to said slab.

16. An article of manufacture as defined in claim 15, in which said tying means includes spacers retaining successive turns of said helix in spaced relation.

17. An article of manufacture as defined in claim 14, in which said slab is L-shaped in cross section.

18. An article of manufacture as defined in claim 14, in which said slab comprises concrete, said concrete embedding a portion of said helix.

19. An article of manufacture as defined in claim 18, in which the turns of said helix include aligned perforations in the walls of the tire loops, and in which the concrete slab includes a reinforcing bar passing through said perforations.

20. An article of manufacture as defined in claim 8, in which at least some of the turns of the helix are in the form of a spiral.

21. An article of manufacture as defined in claim 20, in which the turns of the helix on at least one end are in the form of a spiral.

22. An article of manufacture as defined in claim 20, including tying means interconnecting the turns of said spiral.

* * * * *